(12) United States Patent
Chaudhry et al.

(10) Patent No.: US 7,899,849 B2
(45) Date of Patent: Mar. 1, 2011

(54) DISTRIBUTED SECURITY PROVISIONING

(75) Inventors: Jay Chaudhry, Saratoga, CA (US); Arcady V. Schekochikhin, Cupertino, CA (US); Srikanth Devarajan, San Jose, CA (US); Narinder Paul, Sunnyvale, CA (US); Kailash Kailash, San Jose, CA (US)

(73) Assignee: Zscaler, Inc., Sunnyvale, CA (US)

( * ) Notice: Subject to any disclaimer, the term of this patent is extended or adjusted under 35 U.S.C. 154(b) by 447 days.

(21) Appl. No.: 12/128,371

(22) Filed: May 28, 2008

(65) Prior Publication Data

US 2009/0300045 A1 Dec. 3, 2009

(51) Int. Cl.
G06F 12/00 (2006.01)
(52) U.S. Cl. .................. 707/821; 713/150
(58) Field of Classification Search ........... 707/609, 707/705, 821
See application file for complete search history.

(56) References Cited

U.S. PATENT DOCUMENTS

2007/0028291 A1 2/2007 Brennan et al.
2007/0168533 A1* 7/2007 Canright et al. ............. 709/230
2007/0294391 A1 12/2007 Kohn
2008/0034425 A1 2/2008 Overcash et al.

OTHER PUBLICATIONS

PCT International Search Report and the Written Opinion, PCT/US2009/044972, Dec. 31, 2009, 12 pages.

* cited by examiner

*Primary Examiner*—Pierre M Vital
*Assistant Examiner*—Troung V Vo
(74) *Attorney, Agent, or Firm*—Fish & Richardson P.C.

(57) ABSTRACT

Systems, methods and apparatus for a distributed security that provides security processing external to a network edge. The system can include many distributed processing nodes and one or more authority nodes that provide security policy data, threat data, and other security data to the processing nodes. The processing nodes detect and stop the distribution of malware, spyware and other undesirable content before such content reaches the destination network and computing systems.

21 Claims, 7 Drawing Sheets

DISTRIBUTED SECURITY PROVISIONING

BACKGROUND

This disclosure relates to security provisioning.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

Such layered security systems are prone to processing inefficiencies and can require many resources within the enterprise to maintain the systems. For example, a company may have a multi-layered security system deployed within its network. A file received on company computers may be processed by a content filtering system, an intrusion detection system and pass through the company's firewall to each computer that receives the file. Furthermore, each computer may include virus scanning software that may scan the file when it is received. Thus, regardless of the file integrity, each file may potentially be inspected multiple times by multiple processes, causing processing delays. Thus, while the objective of protecting enterprise is met, it is nevertheless met in a relatively inefficient manner.

Additionally, many of these layered defenses operate independently and do not provide feedback to different security layers. For example, the virus scanning software a company uses may not be able to communicate with a company firewall. Thus the firewall may continue to pass the infected file, and each computer that receives the infected file will expend resources performing security operations, and each user of those computers will likewise spend time to perform manual remedial actions in response to the security threat.

Many layered security systems do not implement a distribution infrastructure to communicate and share content intelligence. This results in repeated processing of both good and bad content. For example, information related to a virus outbreak detected in an enterprise location can not be readily propagated to a central office or other branches of the enterprise; uniform resource locators (URLs) found to include malicious software ("malware") or objectionable content can not be readily propagated to a central office or other branches of the enterprises, etc.

Many layered security systems also cannot readily maintain a central data store of threat data that classifies content items such as files, URLs, e-mails according to security classifications (e.g. virus, malware, spam mail, etc.).

Bandwidth is also a practical limitation in layered security systems implemented in enterprises. Often a threat detection happens at the enterprise perimeter and inside the network edge of the enterprise, after consuming the link bandwidth. For example, an enterprise can stop downloading music content or news feeds by examining the content at an enterprise gateway; however, such monitoring necessarily sacrifices at least the amount of bandwidth required to recognize it as a particular type of content.

Additionally, many computing devices may not have enough resources to run malware or virus detection software, such as cellular phones, internet enabled appliances, and the like. Thus these devices may be vulnerable to attack.

Finally, generating a consolidated security view of the enterprise is a difficult process, as this requires the collecting of data from different locations and user groups and arranging the data in a common time order before abstracting and generating reports. Due to disparity in the security products across locations, there is difficulty in capturing the information into a common format. In addition, the cost of communicating these records in real-time is substantial. For example, an enterprise with 10 small branches and a head office can have a mean transaction rate of 100 requests per second. Each transaction yields a log record of 512 bytes. This results in the usage of 50 Kbytes/sec (400 kilobits per second) of uplink bandwidth. Small locations that are served through DSL links have an uplink bandwidth of 300 Kbits/sec-500K kilobits per second, and thus the transfer of the log records would significantly impact system response time. The bandwidth constraint is only increased for larger enterprises with thousands of users.

SUMMARY

The subject matter described in this specification is directed to distributed security provisioning. Security processing for an enterprise can, for example, be provided external to a network edge of the enterprise. In an implementation, a distributed network security system comprising content processing nodes detects and stops the distribution of malware, spyware and other undesirable content before such content reaches the destination network and computing systems. The system can include many distributed processing nodes and one or more authority nodes that provide security policy data, threat data, and other security data to the processing nodes. The system can, for example, share defense events across processing nodes in near real-time to harden the defense capabilities of the processing nodes in the network. Each processing node can include a collection of data inspection engines, with each engine specialized in detecting specific classes of threats. Multiple engines operate on the data in parallel.

In general, one aspect of the subject matter described in this specification can be embodied in methods that include the following actions in a processing node: providing data communication to a plurality of external systems; storing security policies received from an authority node; monitoring content items requested by or sent from the external systems; threat detecting content items to classify the content items according to threat classifications; and enforcing, external to the network edges of the external systems, the security policies for the plurality of external systems in accordance with the security policies and the classifications of the content items. Other implementations of this aspect include corresponding systems, apparatus, and computer program products.

Another aspect of the subject matter described in this specification can be embodied in methods that include the following actions in an authority node: receiving security policy data defining security policies for each of a plurality of the external systems, threat classification data defining threat classifications for a plurality of content items, and detection processing filtering data defining whether content items have been threat detection processed; distributing the security policy data, the threat classification data, and the detection processing filtering data to a plurality of processing node systems; receiving threat update data from a processing node system, the threat update data for updating the threat classification data and the detection processing filter; updating the threat classification data and the detection processing filtering data based on the threat update data; and distributing the updated threat classification data and the updated detection processing filtering data to the plurality of processing nodes. Other implementations of this aspect include corresponding systems, apparatus, and computer program products.

The subject matter described in this specification also includes other aspects. Additionally, one or more of the following advantages can be realized by implementations of the subject matter described in this specification. The administration, maintenance and upgrading of a security system for a plurality of users (e.g., enterprises) is facilitated through an authority node. Threat detection results can be shared across company locations and across companies without sacrificing privacy of the communication. The requirement for multiple updates of security processes implemented in individual computer devices (e.g., personal computers) is minimized or eliminated. Enterprises with multiple locations need not maintain security protection centers at each of the multiple locations. The system provides a communication infrastructure that automatically propagates threat data regarding defense events to multiple processing nodes reduces protection delays, resource requirements and costs. Additionally, collection of defense logging data can be done external to the network edge of an enterprise, reducing or minimizing the impacts on available bandwidth within the enterprise. Threat detection scales with user accesses and make relevant threat detection data available in fast in memory caches. Mobile users can be provided with same level of protection as accesses from desktops.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
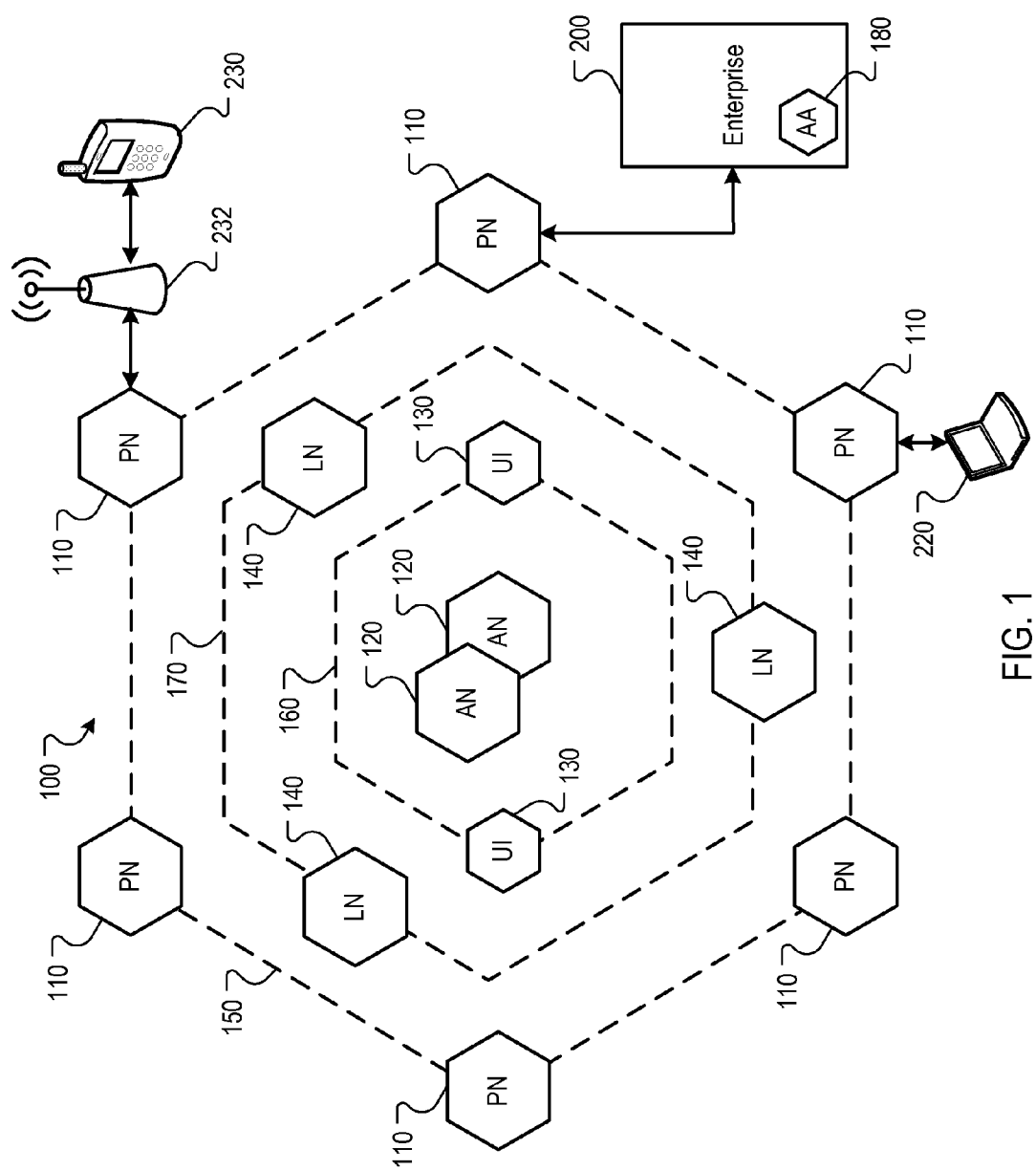
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d_1, d_2, \ldots, d_n]$ for a content item of one or more parts $C=[c_1, c_2, \ldots, c_m]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c_1, c_2, \ldots, c_m]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.0 Example Detailed System Architecture and Operation

Figure 2:
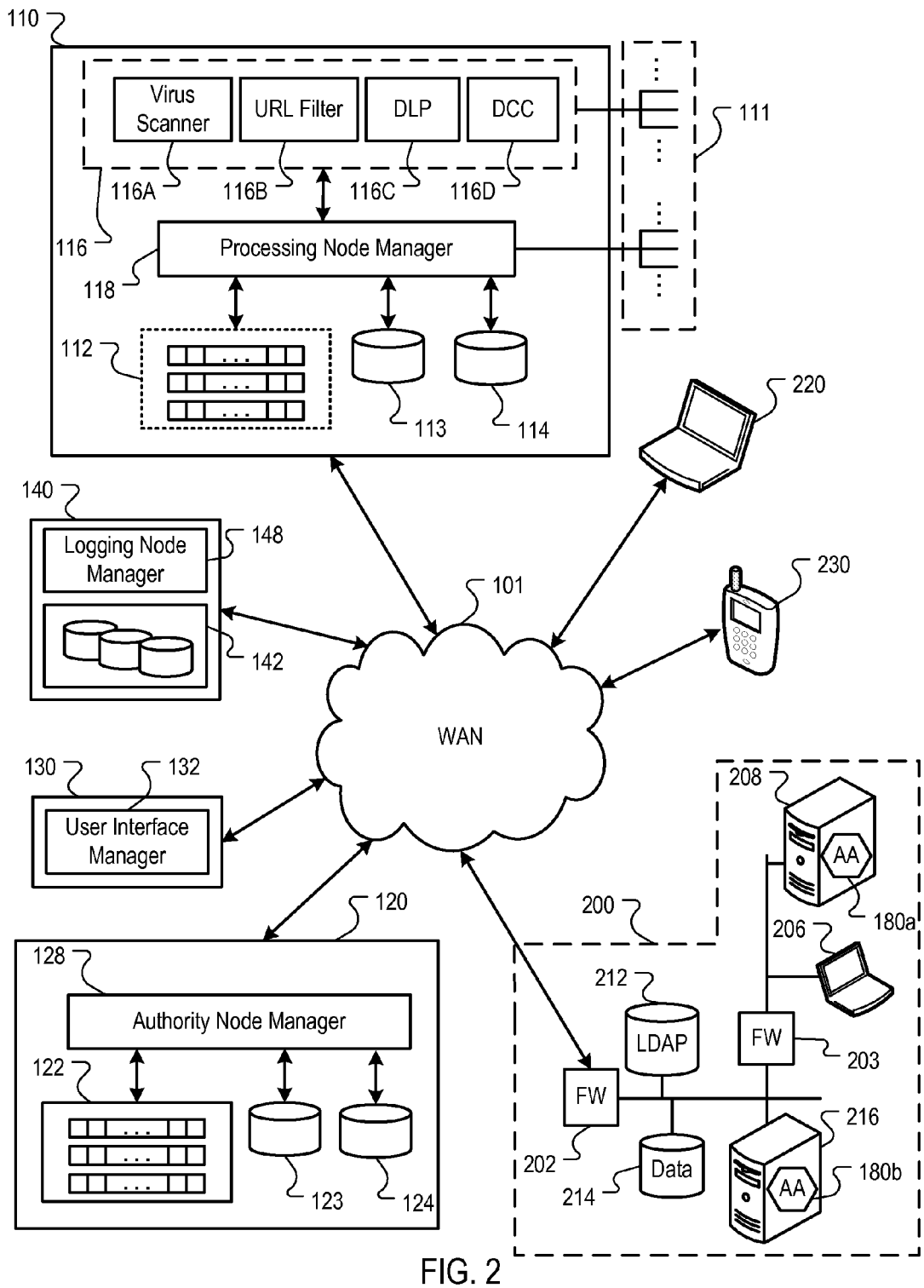
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

In some implementations, a client access agent 180a can be included on a client computer 208. The client access agent 180a can, for example, facilitate security processing by providing a hash index of files on the user computer 208 to a processing node 110 for malware and/or virus detection. Other security operations can also be facilitated by the access agent 180a.

In some implementations, a server access agent 180b can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the server access agent 180b.

The computer device 220 and the mobile device 230 can also store information warranting security measures, such as personal bank records, medical information, and login information, e.g., login information to the server 206 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In some implementations, the processing node 110 can utilize a layered threat detection architecture 111. The layered threat detection architecture 111 can utilize a multi-layered feedback scheme that abstracts thread data between each layer. An example layered threat detection architecture 111 is shown and described in FIG. 3. Other threat detection architectures can also be used, however, and such architectures need not be layered.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124.

§2.3.1 Threat Data Push

In a threat data push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In some implementations, the authority node manager 128 can automatically transmit the updated threat data to other processing nodes 110. Accordingly, threat data for new threats as the new threats are encountered are automatically distributed to each processing node 110. Upon receiving the new threat data from the authority node 120, each processing node manager 118 can store the updated threat data in the locally stored threat data 114.

§2.3.2 Threat Data Pull And Push

In a threat data pull and push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data, then the processing node manager 118 can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 112 and the classification of the content item.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

§2.3.3 Detection Process Filter and Threat Data Push

In a detection process filter and threat data push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the content item is classified by the threat data 114, then the processing node manager 118 can manage the content item in accordance with the security policy data 113 and the classification of the content item.

Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in turn, can update the master threat data 124 and the master detection process filter 122 stored in the authority node data store according to the threat data update received from the processing node 110. In some implementations, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 can update its local copy of the detection processing filter 112 and threat data 114.

§2.3.4 Detection Process Filter and Threat Data Pull and Push

In a detection process filter and threat data pull and push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters can be updated in the system 100 of FIGS. 1 and 2. Other update processes, however, can also be used.

The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

§3.0 Layered Threat Detection

Figure 3:
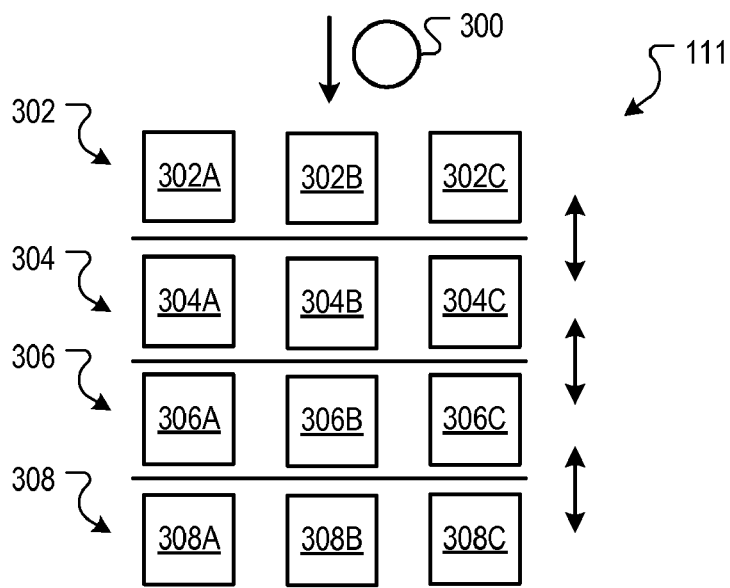
FIG. 3 is a block diagram of a multilayer threat detection architecture.

FIG. 3 is a block diagram of a multilayer threat detection architecture. In some implementations, each processing node 110 can analyze the requests and responses 300 according to the multilayer threat detection architecture that includes one or more data inspection layers 302, 304, 306 and 308 include one or more detection processes that operate in parallel. Example layers can include a user layer 302, a network layer 304, an object layer 306 and a content layer 308. Other layers and architectures can also be used.

The user layer 302 can include one or more user layer inspection engines 302A, 302B and 302C configured to perform user layer processes. Example user layer processes include login authentications, session time outs, token validations, etc.

The network layer 304 can include one or more user layer inspection engines 304A, 304B and 304C configured to perform network layer processes. Example network layer processes include internet protocol address checking, allowing or disallowing a content item associated with an internet protocol address, etc.

The object layer 306 can include one or more object layer inspection engines 306A, 306B and 306C configured to perform object layer processes. Example object layer processes include identifying a hypertext transfer protocol header associated with a content item and allowing or disallowing the content item based on the identified hypertext transfer protocol header, metadata filtering, etc.

The content layer 308 can include one or more content layer inspection engines 308A, 308B and 308C configured to perform content layer processes. Example content layer processes include virus scanning a content item and allowing or disallowing the content item based on the virus scanning; rejecting files base on a file type, etc.

In some implementations, each layer 302, 304, 306 and 308 can provide threat classification feedback to an upper layer. In one implementation, each layer has a set of decision systems that feeds back the findings to the upper layer for abstracting the threat findings. For example, after a virus scan, the content layer 308 can provide the result to the object layer 306. The object layer 306 can then index the findings against the object identity of the content (for example URL with content checksum) and record the findings for future use. Thereafter, a check at the objection layer 306 can identify the content as infected, and a separate process in the content layer 308 need not be initiated. This information can be stored in the threat data 114 and shared with other processing nodes 110 and/or the authority node 120, as described above.

By way of another example, the content layer 308 may detect contents from a specific address as pornographic content. The object layer 306 can record the specific page as a pornographic page and provide this information to the network parameter layer 304. After a sufficient number of pages from destination (e.g., internet protocol address or domain name) are identified as pornographic, the network parameter layer 304 can then index a specific destination as pornographic using the internet protocol address or domain name. Thereafter, a check at the network parameter layer 304 can identify the page or content as objectionable, and a separate process at layers 306 and 308 can be precluded. This information can be stored in the threat data 114 and shared with other processing nodes 110 and/or the authority node 120, as described above.

At a highest level, a user's continued violation of security policies can result in either a lock out or limited access to resources from the user account. For example, if network layer 304 feeds back data identifying the detection of frequent security violations (e.g., attempted access to sites having malware, attempted access to pornographic sites, and the requesting of infected files) associated with a user account, then the user account may itself be locked down or access privileges curtailed (e.g., the user may only be allowed access within an enterprise intranet, and all requests outside of the enterprise firewall may be precluded). This information can be stored in the threat data 114 and shared with other processing nodes 110 and/or the authority node 120, as described above.

In some implementations, the content layer 308 processes can be implemented in the data inspection engines 116 of a processing node 110, and the user layer 302, network layer 304 and object layer 306 processes can be implemented in the processing node manager 118. Other layer distributions can also be used.

The example implementations described above perform security functions for external systems external to the network edges of the external systems, saving network resources in the external systems. All transactions are logged as log data 142 in one or more logging nodes 140 by a logging node manager 148. Thus, security log data can be collected and/or stored external to the network edges of the external systems, resulting in very little security log related traffic within the external systems. The security log data, however, can be readily accessed by the user interface front-end 130. For example, a user interface manager 132 can be used to generate log reports, execute security scenarios, monitor network traffic, etc.

§4.0 Example Processes for Providing Distributed Security Provisioning

Figure 4:
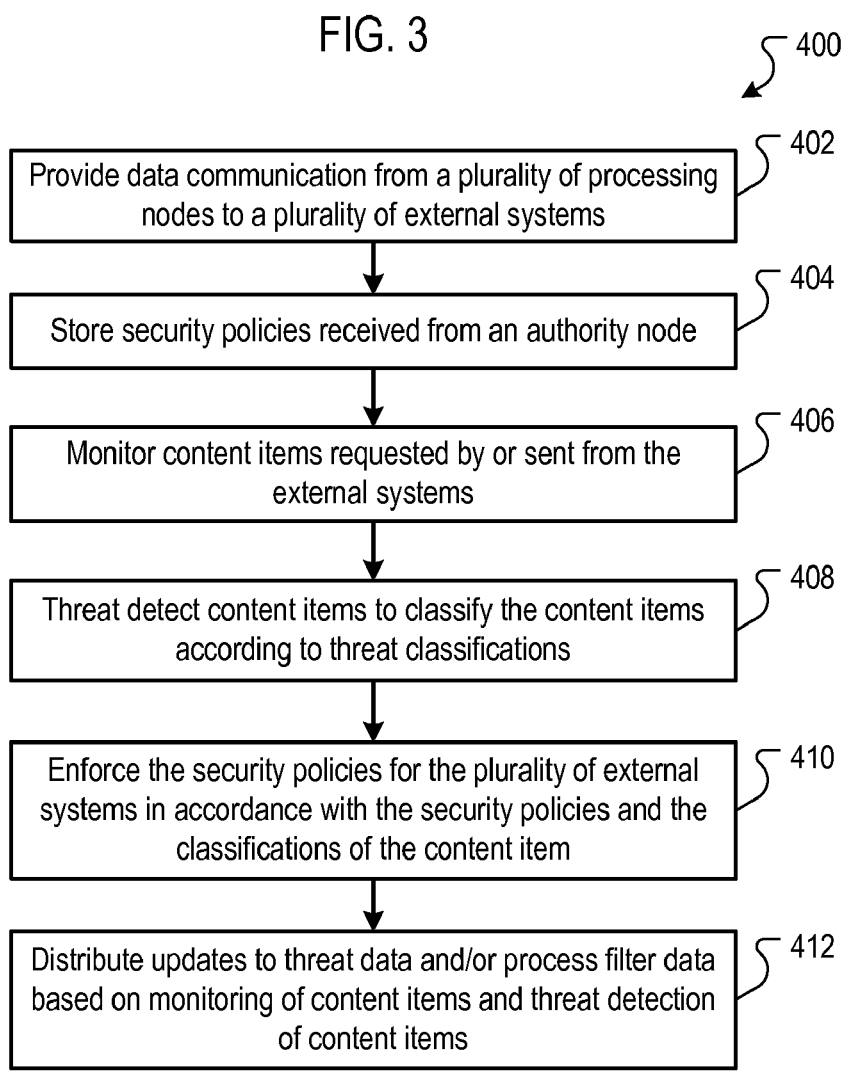
FIG. 4 is a flow diagram of an example process for providing distributed security provisioning.

FIG. 4 is a flow diagram of an example process 400 for providing distributed security provisioning. The process 400 can, for example, be implemented in the system 100 of FIGS. 1 and 2, or in other security systems having a distributed architecture. The stages shown in FIG. 4 are each processes that can be executed independently and concurrently as appropriate.

Stage 402 provides data communication from a plurality of processing nodes to a plurality of external systems. For example, the processing nodes 110 can be used to establish data communication with the external system 200, 220 and 230.

Stage 404 stores security policies received from an authority node. For example, the processing nodes 110 can store the security policy data 113 received from an authority node 120. The authority node 120 can provide the security policy data 113 in response to accessing the master security policy data 123.

Stage 406 monitors content items requested by or sent from the external systems. For example, the processing nodes 110 can monitor files, URL requests, and e-mail communications sent to and requested by the external systems 200, 220 and 230. Data communications can be monitored by the system 100 in a variety of ways, depending on the size and data requirements of the external system. For example, the enterprise 200 may have multiple routers that are used to communicate over the Internet, and the routers may be configured to establish communications through the nearest (in traffic communication time) processing node 110. The mobile device 230 may be configured to communicate to a nearest processing node 110 through any available wireless access device, such as an access point, or a cellular gateway. The single computer device 220, such a consumer's personal computer, may have its browser and e-mail program configured to access the nearest proxy node 110, which, in turn, serves as a proxy for the computer device 220. Alternatively, an Internet provider may have all of its customer traffic processed through processing nodes 110.

Stage 408 threat detects content items to classify the content items according to threat classifications. For example, the data inspection engines 116 of a processing node 110 can perform threat detection processes such as virus scans and URL malware detection to classify the content items according to virus and malware classifications.

Stage 410 enforces the security policies for the plurality of external systems in accordance with the security policies and the classifications of the content item. For example, the processing node 110 can manage the content items according to the threat classifications on the content items and the security policies of each external system 200, 220 and 230.

Stage 412 distributes updates to threat data and/or process filter data based on monitoring of content items and threat detection of content items. For example, the processing node 110 and/or the authority node 120 can distributes updates to threat data and/or process filter data based on monitoring of content items and threat detection of content items. The updates can be distributed by any of the push/pull schemes described above, or according to any one of the flow diagrams of FIGS. 5-8 below.

Figure 5:
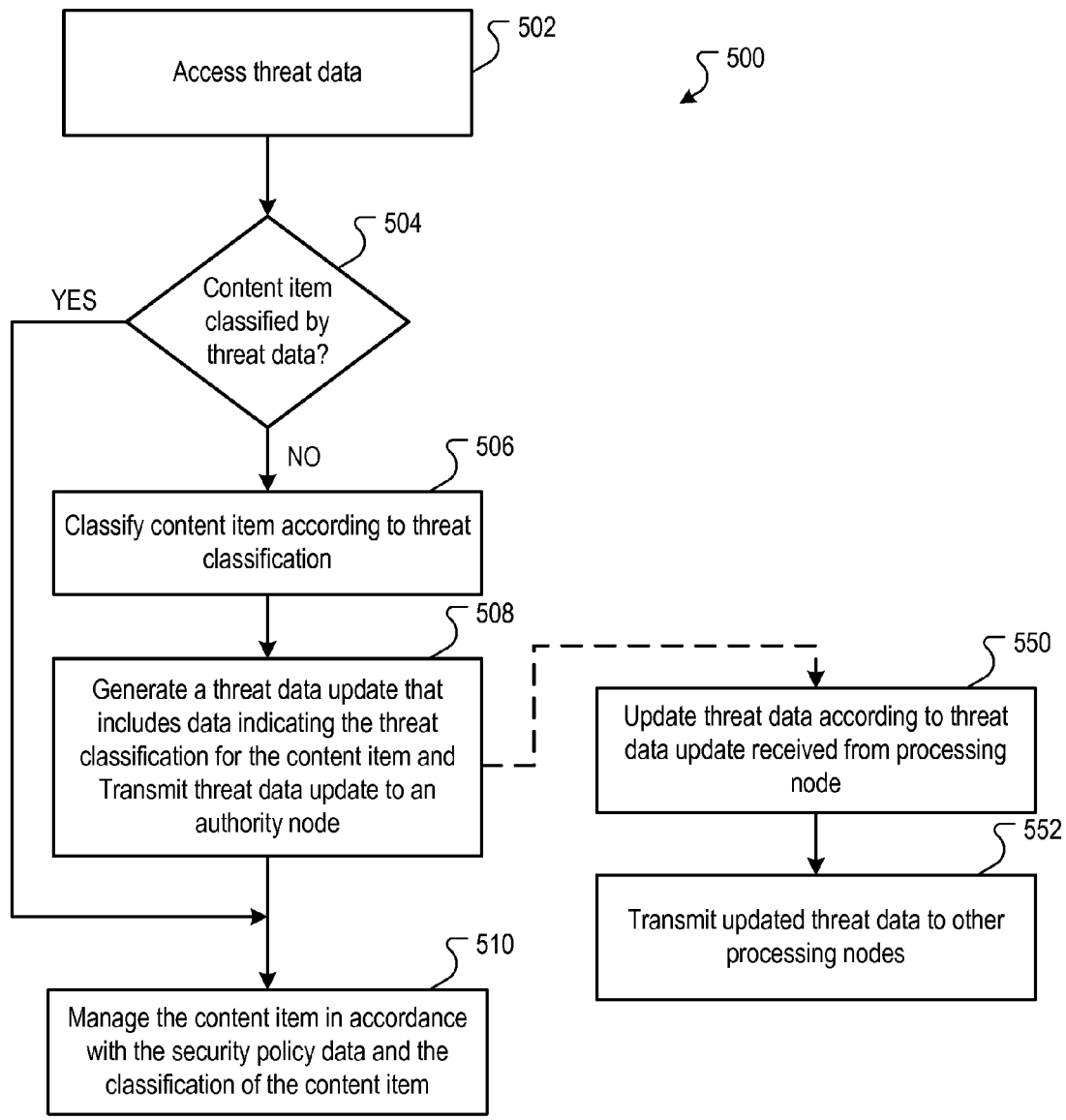
FIG. 5 is a flow diagram of an example process for handling threats in a distributed security system.

FIG. 5 is a flow diagram of an example process for handling threats in a distributed security system. The process 500 can, for example, be implemented in the system 100 of FIGS. 1 and 2, or in other security systems having a distributed architecture.

Stage 502 accesses threat data. For example, the processing node manager 118 can access threat data 114 stored in a processing node data store, e.g., a hard drive, a database, or in random access memory.

Stage 504 determines whether a content item is classified by threat data. For example, the processing node manager 118 can determine whether a content item requested by or transmitted from an external system is classified by the threat data 114.

If the content item is determined to be classified by the threat data 114, then stage 510 manages the content item in accordance with the security policy data 113 and the classification of the content item. For example, the processing node manager 118 can manage the content item according to the security classification of the content item and the security policy of the external system.

If however, the content item is determined to not be classified by the threat data 114, then stage 506 classifies the content item according to threat classification. For example, the processing node manager 118 can cause one or more of the data inspection engines 116 to perform the threat detection processes to classify the content item according to a threat classification.

Stage 508 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 510 as described above.

In response to the execution of stage 508, stage 550 updates threat data according to threat data update received from processing node. For example, the authority node manager 128, in response to receiving the threat data update, updates the master threat data 124 stored in the authority node data store according to the threat data update received from the processing node 110.

Stage 552 transmits the updated threat data to other processing nodes. For example, the authority node manager 128 can automatically transmit the updated threat data to other processing nodes 110.

Figure 6:
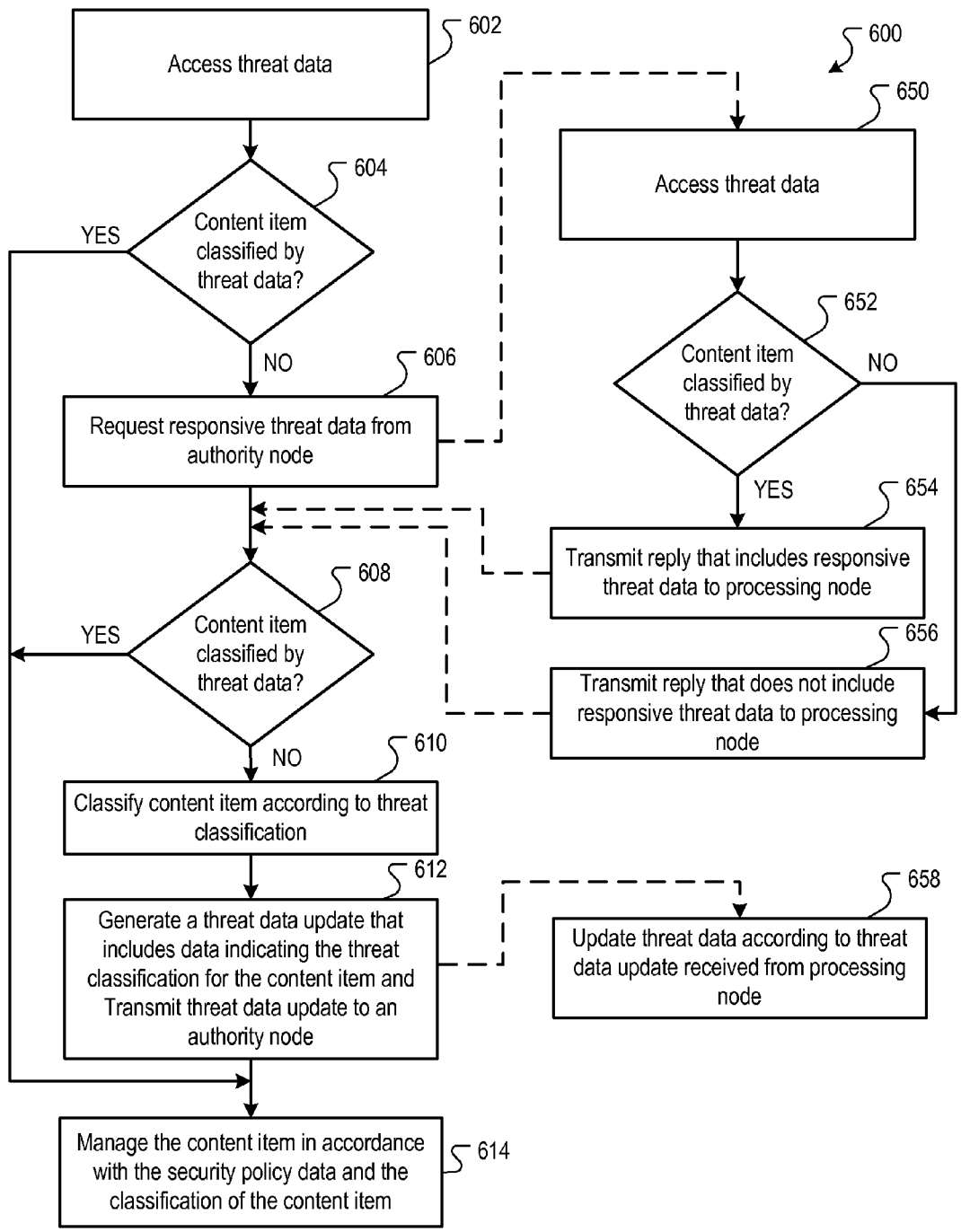
FIG. 6 is a flow diagram of an example process for handling threats in a distributed security system.

FIG. 6 is a flow diagram of an example process for handling threats in a distributed security system. The process 600 can, for example, be implemented in the system 100 of FIGS. 1 and 2, or in other security systems having a distributed architecture.

Stage 602 accesses threat data. For example, the processing node manager 118 can access threat data 114 stored in a processing node data store, e.g., a hard drive, a database, or in random access memory.

Stage 604 determines whether a content item is classified by threat data. For example, the processing node manager 118 can determine whether a content item requested by or transmitted from an external system is classified by the threat data 114.

If stage 604 determines that the content item is classified by the threat data 114, then stage 614 manages the content item in accordance with the security policy data 113 and the classification of the content item. For example, the processing node manager 118 can manage the content item according to the security classification of the content item and the security policy of the external system.

If stage 604 determines that the content item is not classified by the threat data, then stage 606 requests responsive threat data from an authority node. For example, the processing node manager 118 can request responsive threat data for the content item from the authority node 120.

Stage 608 determines if a reply received from the authority node in response to the request indicates whether the content item is classified by threat data. For example, the processing node manager 118 can determine if the reply received from the authority node 120 includes responsive threat data. If the processing node manager 118 determines that the reply received from the authority node 120 includes responsive threat data, then stage 614 can be executed as described above.

Conversely, if stage 608 determines that the reply received from the authority node does not include responsive threat data, then stage 610 classifies the content item according to threat classification. For example, the processing node manager 118 can cause one or more of the data inspection engines 116 to perform the threat detection processes to classify the content item according to a threat classification.

Stage 612 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 614 as described above.

In response to the execution of stage 606, stage 650 accesses threat data. For example, the master threat data 124 at an authority node can be accessed by an authority node manager 128.

Stage 652 determines if the content item is classified by the accessed threat data. For example, the authority node manager can determine if the content item is classified by the master threat data 124.

If stage 652 determines that the content item is classified by the accessed threat data, then stage 654 transmits a reply to the requesting processing node that includes responsive threat data. For example, the authority node manager 128 can transmit a reply that includes the responsive threat data, after which stage 608 is executed.

Conversely, if stage 652 determines that the content item is not classified by the accessed threat data, then stage 656 transmits a reply to the requesting processing node that includes responsive threat data. For example, the authority node manager 128 can transmit a reply that does not include the responsive threat data, after which stage 608 is executed.

Stage 658 receives threat data update transmitted in response to the execution of stage 612 and updates threat data according to the treat data update received. For example, the authority node manager 128 can then update the master threat data 124 based on the threat data update received from the processing node manager 118.

Figure 7:
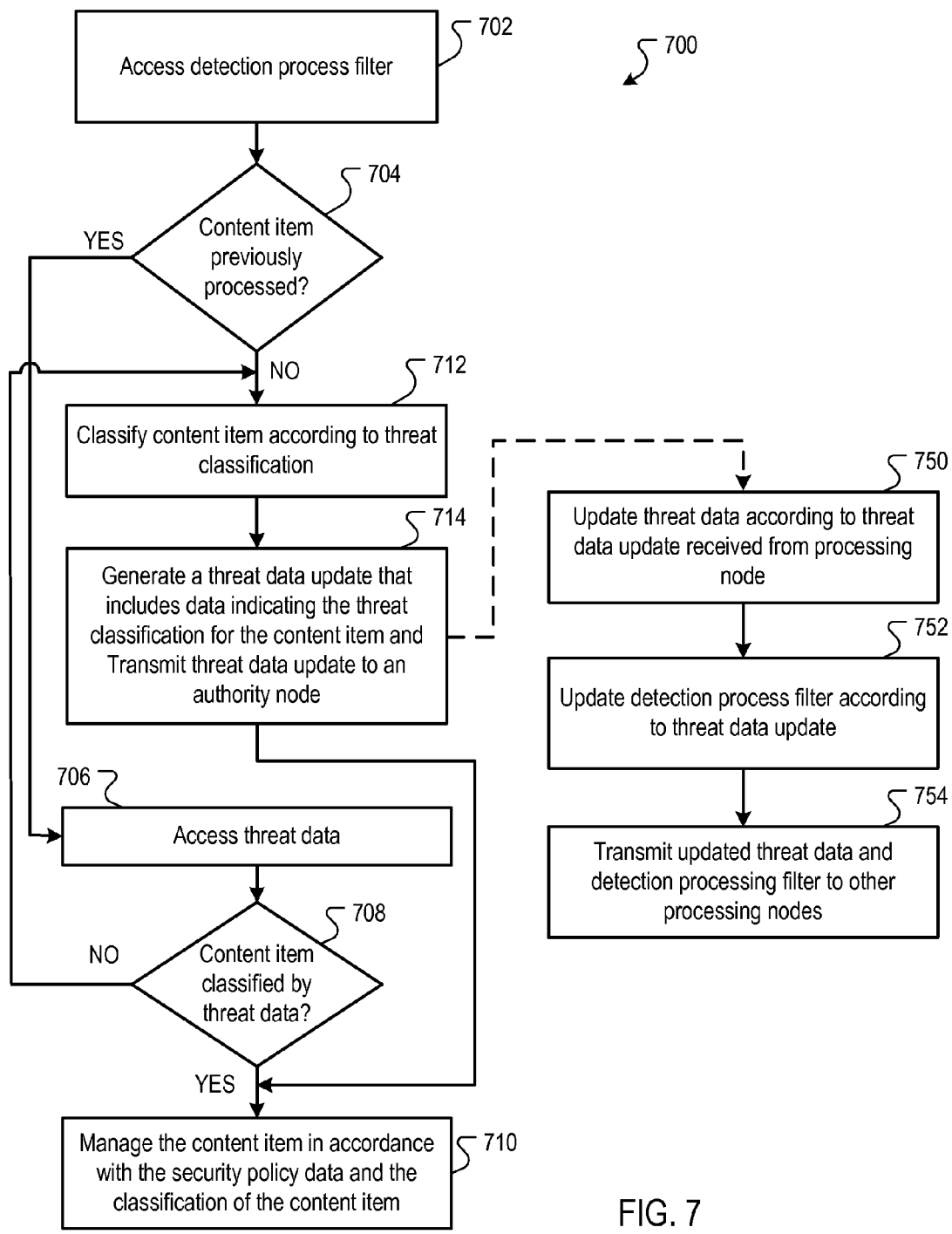
FIG. 7 is a flow diagram of an example process for handling threats in a distributed security system.

FIG. 7 is a flow diagram of an example process for handling threats in a distributed security system. The process 700 can, for example, be implemented in the system 100 of FIGS. 1 and 2, or in other security systems having a distributed architecture.

Stage 702 accesses a detection process filter. For example, the processing node manager 118 can access the detection process filter 112 stored in a processing node data store, e.g., a hard drive, a database, or in random access memory.

Stage 704 determines whether a content item has been previously processed. For example, the processing node manager 118 can determine whether a content item requested by or transmitted from an external system has been previously processed by a processing node based on the detection processing filter 112 output.

If stage 704 determines that the content item has been previously processed, then stage 706 accesses the threat data to determine the classification of the content item, and stage 708 determines if the content item is classified by the threat data. For example, the processing node manager 118 can access the threat data 114 and determine whether a content item requested by or transmitted from an external system is classified by the threat data 114.

If the content item is determined to be classified by the threat data, then stage 710 manages the content item in accordance with the security policy data and the classification of the content item. For example, the processing node manager 118 can manage the content item according to the security classification of the content item and the security policy 113 of the external system.

If however, the content item is determined to not be classified by the threat data 114, then stage 712 classifies the content item according to threat classification. For example, the processing node manager 118 can cause one or more of the data inspection engines 116 to perform the threat detection processes to classify the content item according to a threat classification.

Stage 714 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 710 as described above.

In response to the execution of stage 714, stage 750 updates threat data according to threat data update received from processing node. For example, the authority node manager 128, in response to receiving the threat data update, updates the master threat data 124 stored in the authority node data store according to the threat data update received from the processing node 110.

Also in response to the execution of stage 714, stage 752 updates the detection process filter according to threat data update received from processing node. For example, the authority node manager 128, in response to receiving the threat data update, updates the master detection process filter 122 stored in the authority node data store according to the threat data update received from the processing node 110.

Stage 754 transmits the updated threat data to other processing nodes. For example, the authority node manager 128 can automatically transmit the updated threat data and detection process filter to other processing nodes 110.

Figure 8:
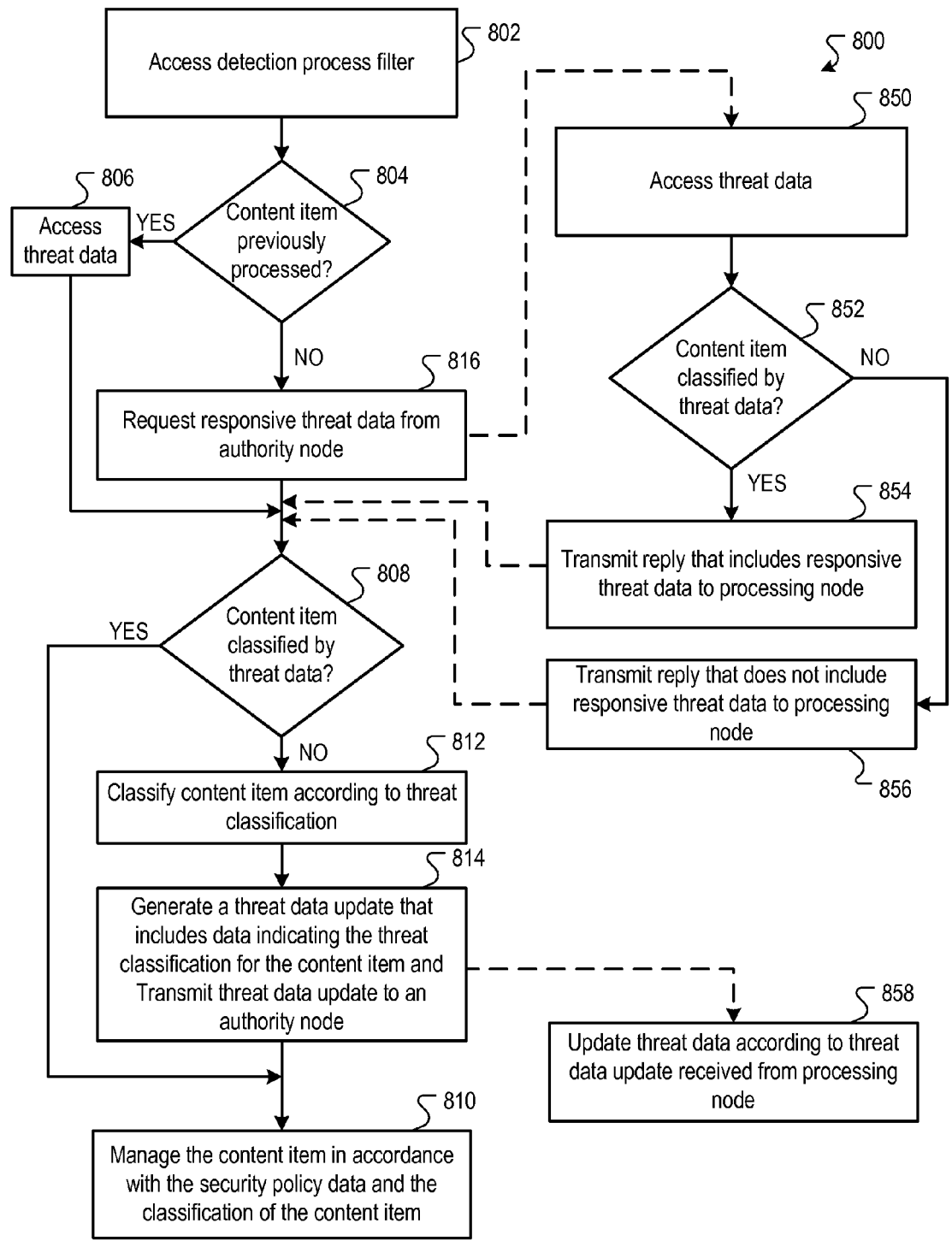
FIG. 8 is a flow diagram of an example process for handling threats in a distributed security system.

FIG. 8 is a flow diagram of an example process for handling threats in a distributed security system. The process 800 can, for example, be implemented in the system 100 of FIGS. 1 and 2, or in other security systems having a distributed architecture.

Stage 802 accesses a detection process filter. For example, the processing node manager 118 can access the detection process filter 112 stored in a processing node data store, e.g., a hard drive, a database, or in random access memory.

Stage 804 determines whether a content item has been previously processed. For example, the processing node manager 118 can determine whether a content item requested by or transmitted from an external system has been previously processed by a processing node based on the detection processing filter 112 output.

If stage 804 determines that the content item has been previously processed, then stage 806 accesses the threat data to determine the classification of the content item, and stage 808 determines if the content item is classified by the threat data. For example, the processing node manager 118 can access the threat data 114 and determine whether a content item requested by or transmitted from an external system is classified by the threat data 114.

If the content item is determined to be classified by the threat data, then stage 810 manages the content item in accordance with the security policy data and the classification of the content item. For example, the processing node manager 118 can manage the content item according to the security classification of the content item and the security policy 113 of the external system.

If stage 804, however, initially determines that the content item has not been previously processed, then stage 806 requests responsive threat data from authority node. For example, the processing node manager 118 can request responsive threat data for the content item from the authority node 120.

The process then returns to stage 808, which then determines if the content item is classified by the threat data. For example, the processing node manager 118 can determine if the reply received from the authority node 120 includes responsive threat data. If the processing node manager 118 determines that the reply received from the authority node 120 includes responsive threat data, the stage 810 can be executed as described above. Additionally, the detection process filter 112 stored at the processing node 110 can also be updated to indicate that the content item has been processed, and the responsive threat data can be stored in the threat data 114 stored at the processing node.

Conversely, if stage 808 determines that the reply does not include responsive threat data, then stage 812 classifies the content item according to threat classification. For example, the processing node manager 118 can cause one or more of the data inspection engines 116 to perform the threat detection processes to classify the content item according to a threat classification.

Stage 814 then generates a threat data update that includes data indicating the threat classification for the content item from the threat detection process and transmits the threat data to an authority node. For example, the processing node manager 118 can generate the threat data updates and can transmit the threat data update to an authority node 120.

Thereafter, stage 810 is executed.

In response to the execution of stage 816, stage 850 accesses threat data. For example, the master threat data 124 at an authority node can be accessed by an authority node manager 128.

Stage 852 determines if the content item is classified by the accessed threat data. For example, the authority node manager can determine if the content item is classified by the master threat data 124.

If stage 852 determines that the content item is classified by the accessed threat data, then stage 854 transmits a reply to the requesting processing node that includes responsive threat data. For example, the authority node manager 128 can transmit a reply that includes the responsive threat data, after which stage 808 is executed.

Conversely, if stage 852 determines that the content item is not classified by the accessed threat data, then stage 856 transmits a reply to the requesting processing node that includes responsive threat data. For example, the authority node manager 128 can transmit a reply that does not include the responsive threat data, after which stage 808 is executed.

Stage 858 receives threat data update transmitted in response to the execution of stage 814 and updates threat data according to the treat data update received. For example, the authority node manager 128 can then update the master threat data 124 based on the threat data update received from the processing node manager 118.

The various data exchange processes of FIGS. 4-8 are example processes for which the threat data and/or detection process filters can be updated in the system 100 of FIGS. 1 and 2. Other update processes, however, can also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising:
   a plurality of processing nodes external to network edges of a plurality of external systems, each processing node including one or more computers and comprising:
   a processing node data store storing security policy data defining security policies for each of the external systems;
   a plurality of data inspection engines, each data inspection engine configured to perform a threat detection process to classify content items according to a threat classification for a corresponding threat; and
   a processing node manager in data communication with the data inspection engines and configured to access the security policy data stored in the processing node data store and manage the classified content item in accordance with the security policy data so that security policies for a plurality of external systems in data communication with the processing node are implemented external to the network edges for each of the external systems; and
   an authority node in data communication with the processing nodes, the authority node including one or more computers and comprising an authority node data store storing security policy data for each of the plurality of external systems, and including an authority node manager configured to provide the security policy data to each of the processing nodes;
   wherein the data store in each processing node includes threat data classifying content items by threat classifications and a detection process filter indicating whether content items have been processed by one or more of the data inspection engines, and the processing node manager in each process node is configured to:
   determine whether a content item is classified by the threat data by accessing the detection processing filter to determine whether the content item has been processed;
   if the content item is determined to have not been processed and thus not classified by the threat data, then:
   cause the data inspection engines to perform the threat detection processes to classify the content item according to a threat classification;
   generate a threat data update that includes data indicating the threat classification for the content item from the threat detection process; and
   transmit the threat data update to the authority node;
   if the content item is determined to have been processed and thus classified by the threat data, then manage the content item in accordance with the security policy data and the classification of the content item;
   wherein the authority node manager is further configured to:
   update threat data stored in the authority node data store according to the threat data update received from the processing node, and transmit the updated threat data to the processing nodes; and
   update a detection process filter stored in the authority node data store according to the threat data update and transmit the updated detection process filter to the processing nodes.

2. The system of claim 1, wherein:
   the authority node manager is further configured to update threat data stored in the authority node data store according to the threat data update received from the processing node, and to transmit the updated threat data to other processing nodes; and
   each processing node manager is further configured to store the updated threat data received from the authority node in its processing node data store.

3. The system of claim 2, wherein one of the data inspection engines comprises a virus scanning engine and the threat classifications include infected and clean.

4. The system of claim 2, wherein one of the data inspection engines comprises a uniform resource locator filter and the threat classifications include allowed and restricted.

5. The security system of claim 1, wherein the processing node manager in each process node is configured to:
   request responsive threat data for the content item from the authority node if the content item is determined to not be classified by the threat data;
   determine whether a reply from the authority node in response to the request includes the responsive threat data classifying the content item;
   if the reply did not include the responsive threat data classifying the content item, then:
   cause the data inspection engines to perform the threat detection processes to classify the content item according to a threat classification;
   generate a threat data update that includes data indicating the threat classification for the content item from the threat detection process; and
   transmit the threat data update to the authority node; and
   if the reply did include responsive data classifying the content item, then manage the content item in accordance with the security policy data and the classification of the content item.

6. The system of claim 5, wherein:
the authority node manager is further configured to receive the responsive threat data request from the processing node, and determine if the responsive threat data is stored in the authority node data store;
if responsive threat data is stored in the authority node data store, then provide a reply that includes the responsive threat data to the processing node in response to the threat data request; and
if the responsive threat data is not stored in the authority node data store, then:
provide a reply to the processing node that does not include the responsive threat data; and
update threat data stored in the authority node data store according to the threat data update received from the processing node.

7. The system of claim 1, wherein the detection process filter comprises a bloom filter including a hash index and a plurality of binary data indicating whether a content item resolved to a hash index has been processed by a detection engine.

8. The system of claim 1, further comprising a logging node in data communication with the plurality of processing nodes and including a logging data store and a logger configured to store security transaction data each of the plurality of external systems.

9. The system of claim 8, wherein the security transaction data comprises content item logs indicating content item requests from the external systems and corresponding threat classifications of the requested content items.

10. The system of claim 1, wherein the content items include one or more of e-mail messages, web pages, and files.

11. The system of claim 1, wherein the data inspection engines in each processing node comprise a user layer inspection engine configured to perform authentication processes.

12. The system of claim 1, wherein the data inspection engines in each processing node comprise a network layer engine configured to perform network layer processes.

13. The system of claim 12, wherein the network layer processes include identifying internet protocol addresses associated with a content item and allowing or disallowing the content item based on the identified internet protocol address.

14. The system of claim 1, wherein the data inspection engines in each processing node comprise an object layer engine configured to perform object layer processes.

15. The system of claim 14, wherein the object layer processes include identifying an hypertext transfer protocol header associated with a content item and allowing or disallowing the content item based on the identified hypertext transfer protocol header.

16. The system of claim 1, wherein the data inspection engines in each processing node comprise a content layer engine configured to perform content layer processes.

17. The system of claim 16, wherein the content layer processes include virus scanning a content item and allowing or disallowing the content item based on the virus scanning.

18. A computer implemented method of security provisioning, comprising:
providing data communication from a plurality of processing nodes to a plurality of external systems, the processing nodes external to network edges of the plurality of external systems, and in each processing node:
storing security policies defining security policies for each of the external systems and received from an authority node;
storing threat data classifying content items by threat classifications;
monitoring content items requested by or sent from the external systems;
determining whether a content item is classified by the threat data by accessing a detection processing filter indicating whether content items have been processed by one or more data inspection engines to determine whether the content item has been processed;
if the content item is determined to have not been processed and thus not classified by the threat data, then:
threat detecting content items using the one or more data inspection engines to classify the content items according to threat classifications for a corresponding threat
generating a threat data update that includes data indicating the threat classification for the content item from the threat detecting;
transmitting the threat data update to an authority node; and
if the content item is determined to have been processed and thus classified by the threat data, then enforcing, external to the network edges of the external systems, the security policies for the plurality of external systems in accordance with the security policies and the classifications of the content items;
providing data communications between the processing nodes and the authority node, and in the authority node:
update threat data stored in the authority node according to the threat data update received from the processing node, and transmit the updated threat data to the processing nodes; and
update a detection process filter stored in the authority node according to the threat data update and transmit the updated detection process filter to the processing nodes.

19. The method of claim 18, wherein
if the content item is determined to not be classified by the threat data, then requesting responsive threat data for the content item from an authority node;
determining whether a reply from the authority node in response to the request includes the responsive threat data classifying the content item;
if the reply did not include the responsive threat data classifying the content item, then:
threat detection processing to classify the content item according to a threat classification;
generating a threat data update that includes data indicating the threat classification for the content item from the threat detection processing; and
transmitting the threat data update to the authority node; and
if the reply did include responsive threat data classifying the content item, then managing the content item in accordance with the security policy data and the classification of the content item.

20. The method of claim 18, wherein threat detecting content items comprises: detecting threats at a user layer;
detecting threats at a network layer;
detecting threats at an object layer; and
detecting threats at a content layer.

21. One or more machine readable storage device storing software comprising instructions executable by a processing node system and an authority node system, and in response to such execution causes the processing node system to perform operations comprising:

receiving and storing security policy data defining security policies for each of a plurality of the external systems, threat classification data defining threat classifications for a plurality of content items, and detection processing filtering data defining whether content items have been threat detection processed;

identifying a content item requested by or sent from a external system;

determining whether the content item is classified by the threat classification data by accessing the detection processing filter data;

if the content item is determined to have not been processed and thus not classified by the threat data, then:
- threat detecting content items using the one or more data inspection engines to classify the content items according to threat classifications for a corresponding threat;
- generating a threat data update that includes data indicating the threat classification for the content item from the threat detecting;
- transmitting the threat data update to an authority node; and if the content item is determined to have been processed and thus classified by the threat data, then enforcing, external to the network edges of the external systems, the security policies for the plurality of external systems in accordance with the security policies and the classifications of the content items; and upon such execution cause the authority node system to perform operations comprising:
- updating threat data stored in the authority node according to the threat data update received from the processing node system;
- transmitting the updated threat data to the processing node system; and
- updating a detection process filter stored in the authority node according to the threat data update and transmit the updated detection process filter to the processing node system.

* * * * *